(12) United States Patent
Nakajima

(10) Patent No.: US 6,266,152 B1
(45) Date of Patent: Jul. 24, 2001

(54) IMAGE PROCESSING METHOD AND APPARATUS

(75) Inventor: Nobuyuki Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/827,524

(22) Filed: Mar. 28, 1997

(30) Foreign Application Priority Data

Apr. 2, 1996 (JP) .................................. 8-080182

(51) Int. Cl.$^7$ .................................. H04N 1/50; H04N 1/60
(52) U.S. Cl. .................... 358/1.9; 358/504; 358/518; 358/519
(58) Field of Search .................... 358/1.9, 518, 519, 358/520, 521, 523, 504, 501, 527, 534; 382/167

(56) References Cited

U.S. PATENT DOCUMENTS

| | | |
|---|---|---|
| 4,958,219 | 9/1990 | Kadowaki . |
| 5,636,290 * | 6/1997 | Kita et al. ............................. 382/167 |
| 5,726,778 * | 3/1998 | Tanio .................................. 358/518 |
| 5,729,664 * | 3/1998 | Ishikawa ............................... 358/1.9 |
| 6,040,927 * | 3/2000 | Winter et al. ......................... 358/534 |

FOREIGN PATENT DOCUMENTS

| | | | |
|---|---|---|---|
| 0619555 | 10/1994 | (EP) | ............................. G06F/15/72 |
| 0665676 | 8/1995 | (EP) | ............................. H04N/1/60 |
| 0665680 | 8/1995 | (EP) | ............................. H04N/1/60 |
| 0674289 | 9/1995 | (EP) | ............................. G06K/15/02 |
| WO9601467 | 1/1996 | (WO) | ............................. G09G/5/02 |
| WO9610239 | 4/1996 | (WO) | ............................. G06T/11/00 |

* cited by examiner

*Primary Examiner*—Scott Rogers
(74) *Attorney, Agent, or Firm*—Fitzpatrick, Cella, Harper & Scinto

(57) ABSTRACT

An image processor which easily sets color matching processing for each object in an image in accordance with a user's utilization of the image, as well as performing color matching processing suitable for each object and obtaining a high quality output image. In the processor, the type of the output image is manually set from an operation unit, a driver inputs an object image included in the output image, determines the type of the input object image, and performs color matching processing on the object image on the basis of the pre-stored profile information corresponding to the determined type of the object image and the set type of the output image. A controller of a printer assigns priority to gray color reproduction, and always applies gray compensation to a text image, but not to a natural image, and controls whether or not to apply gray compensation to a graphic image in accordance with a manual instruction.

16 Claims, 6 Drawing Sheets

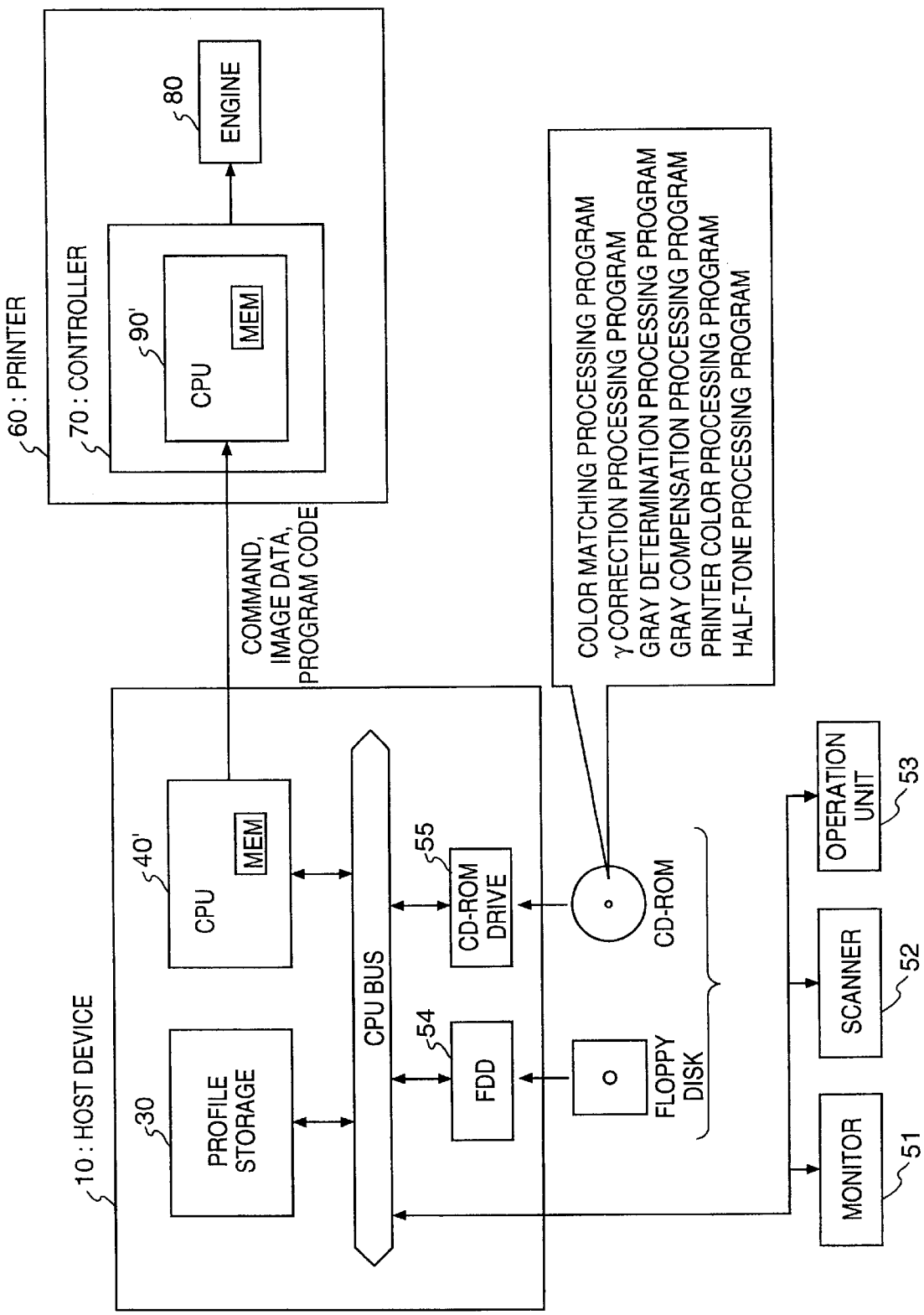

IMAGE PROCESSING METHOD AND APPARATUS

BACKGROUND OF THE INVENTION

The present invention relates to an image processing method and apparatus and, more particularly, to an image processing method and apparatus for performing color processing.

Image processing apparatuses which perform color matching processing for correcting the difference between color representation capabilities on a plurality of image output devices are recently on the market. In such apparatuses, a single color matching is applied to a single output image, for example.

In the color matching processing in the conventional image processing apparatuses, however, in a case where a plurality of objects having different attributes are included in a single output image, it is not possible to perform color matching processing suitable for each object. Therefore, if the plurality of objects which are processed with an identical color matching processing are outputted as a single image to a plurality of image output devices, a problem of deterioration of the output image quality (e.g., color, density balance of the overall image, brightness) arises.

SUMMARY OF THE INVENTION

The present invention has been made in consideration of the above situation, and has as its object to provide an image processing method and apparatus capable of obtaining a high-quality output image by performing color matching processing suitable for each object on the basis of the color representation capability of a source device which generates color image data of the object, depending upon a user's utilization of the image.

According to one aspect of the present invention, the foregoing object is attained by providing an image processing apparatus comprising: setting means for setting a source device in accordance with a manual instruction in correspondence with a type of an object image; determination means for determining the type of the object image which includes input image data; and color matching means for performing color matching processing by using a profile corresponding to the source device set by the setting means in correspondence with the type of the object image determined by the determination means.

In the above apparatus, the setting means preferably realizes to set source devices for types of a plurality of object images, respectively, in accordance with a manual instruction. Or, the color matching means preferably realizes to perform a first color matching processing corresponding to the source device and a second color matching processing corresponding to an output device as the color matching processing. And the second color matching processing is preferably based on the color matching method corresponding to the type of the object image determined by the determination means.

Further, the above apparatus may be further comprises color processing means for performing color processing on the basis of output characteristics of an output device for outputting an image corresponding to the type of the object image.

According to another aspect of the present invention, the foregoing object is attained by providing an image processing method comprising the steps of: setting a source device in accordance with a manual instruction in correspondence with a type of an object image; determining the type of the object image which includes input image data; and performing color matching processing by using a profile corresponding to the set source device in correspondence with the determined type of the object image.

It is another object of the present invention to provide an image processing method and apparatus in which color matching processing for each object can be easily set depending upon a user's utilization of the image including the object.

According to one aspect of the present invention, the foregoing object is attained by providing an image processing apparatus comprising: storage means for storing plural pieces of information showing correspondence between types of a plurality of object images and color matching methods for each type of output images; setting means for setting a type of an output image in accordance with a manual instruction; input means for inputting an object image included in the output image; determination means for determining a type of the object image; and color matching means for performing color matching processing on the object image on the basis of the type of the object image determined by the determination means and the information, corresponding to the type of the output image set by the setting means, stored in the storage means.

According to another aspect of the present invention, the foregoing object is attained by providing an image processing method comprising the steps of: storing plural pieces of information showing correspondence between types of a plurality of object images and color matching methods for each type of output image into a storage medium; setting a type of an output image in accordance with a manual instruction; inputting an object image included in the output image; determining a type of the input object image; and performing color matching processing on the object image on the basis of the determined type of the object image and the stored information corresponding to the set type of the output image.

The invention is particularly advantageous since it is possible to perform color matching processing suitable for each object on the basis of the color representation capability of a source device which generates color image data of the object, depending upon a user's utilization of the image including the object, thereby obtaining a high-quality output image.

Further, it is possible to set color matching processing for each object depending upon a user's utilization of the image including the object.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a block diagram illustrating a general configuration of an image processing system according to another embodiment of the present invention.

DETAILED DESCRIPTION OF THE PREFERRED EMBODIMENTS

Preferred embodiments of the present invention will be described in detail in accordance with the accompanying drawings.

Figure 1:
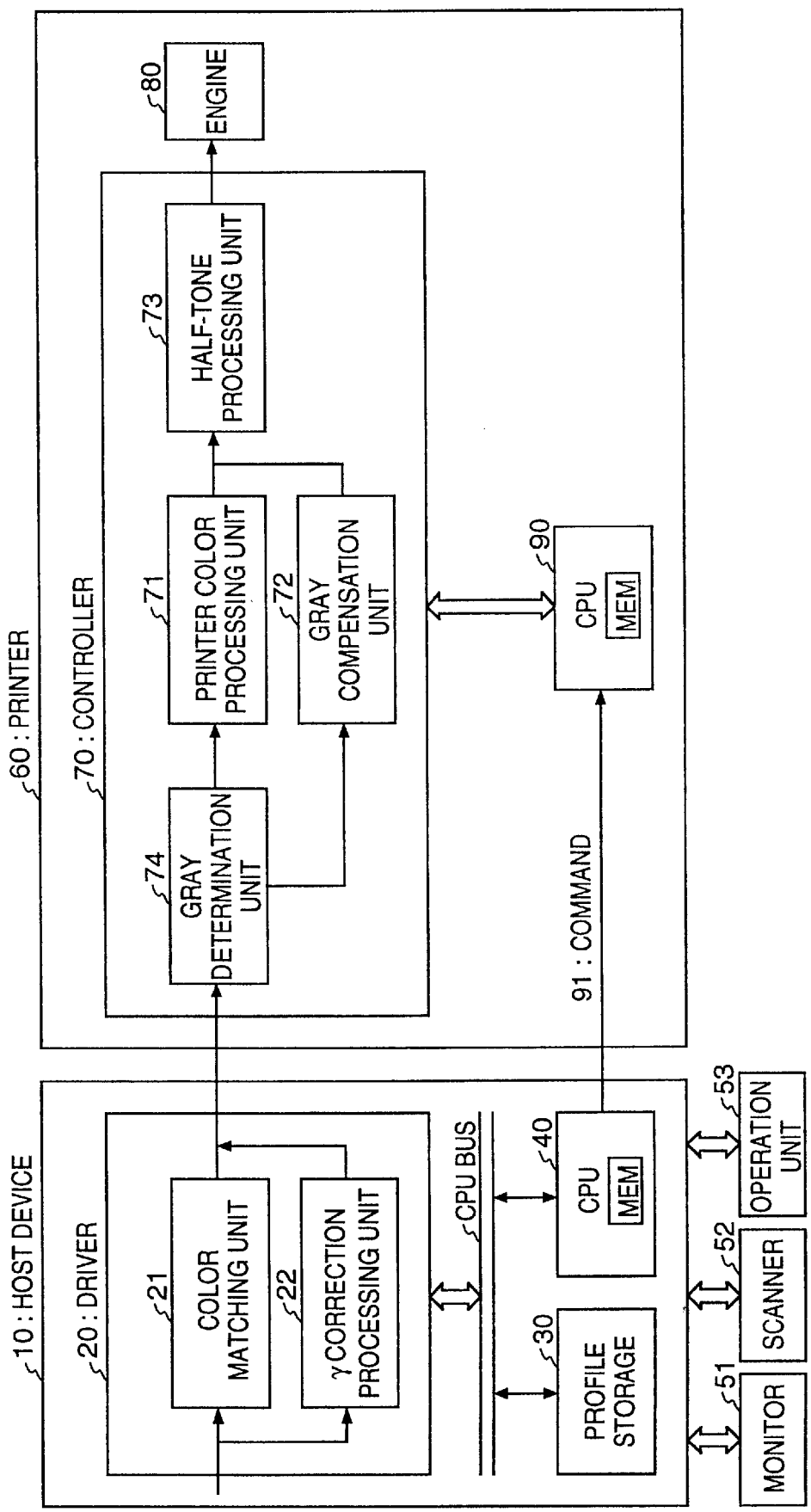
FIG. 1 is a block diagram illustrating a general configuration of an image processing system according to a typical embodiment of the present invention.

FIG. 1 is a block diagram illustrating a brief configuration of an image processing system according to a typical embodiment of the present invention. This system is basically configured with a host device 10 and a printer 60 as shown in FIG. 1.

To the host device 10, a monitor 51, a display device, for visually displaying a processed image, a scanner 52 for reading an original image, and an operation unit 53 from which an operator can input and designate various kinds of setting information are connected in addition to the printer 60. A designation device, such as a keyboard, are provided to the operation unit 53.

Figure 2:
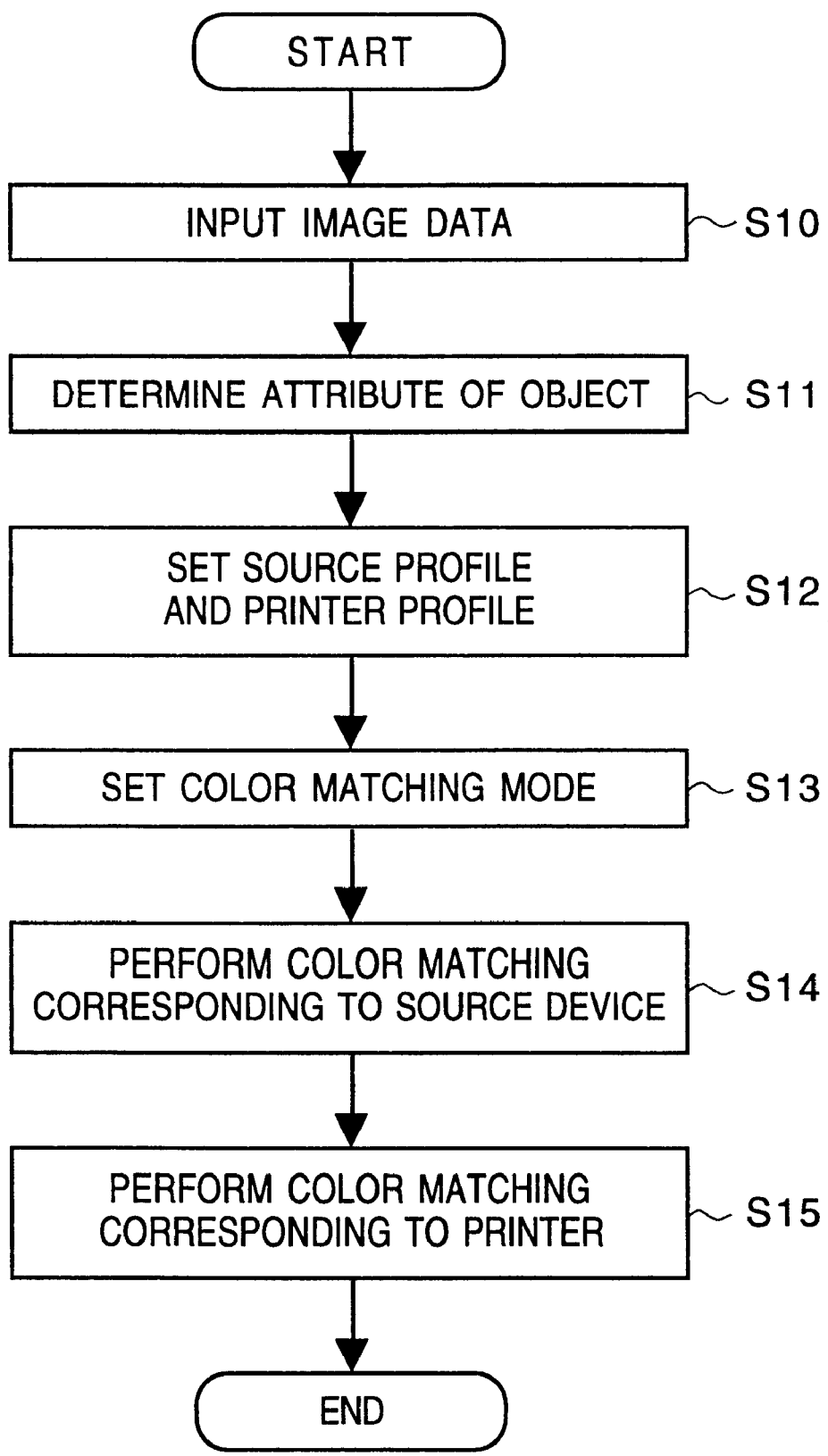
FIG. 2 is a flowchart showing an example of processing performed by a color matching unit in the host device shown in FIG. 1.

Further, the host device 10 includes a driver 20 for outputting each image, which will be explained later, to the printer 60, a profile storage 30 for storing a source profile corresponding to a source device set by the operation unit 53 and a printer profile corresponding to the printer 60, and a CPU 40 which is a controlling unit for controlling the overall operation of the host device in accordance with a control sequence, shown in FIG. 2 which will be explained later, stored in an internal memory (MEM). Further, the driver 20 contains a color matching unit 21 and a γ correction processing unit 22.

The driver 20, the profile storage 30, and the CPU 40 are connected with each other via a CPU bus. It should be noted that the source device is a device on which color image data depends. Further, the source profile and the printer profile hold information on color representation characteristics of the source device and the printer, respectively.

Figure 3:
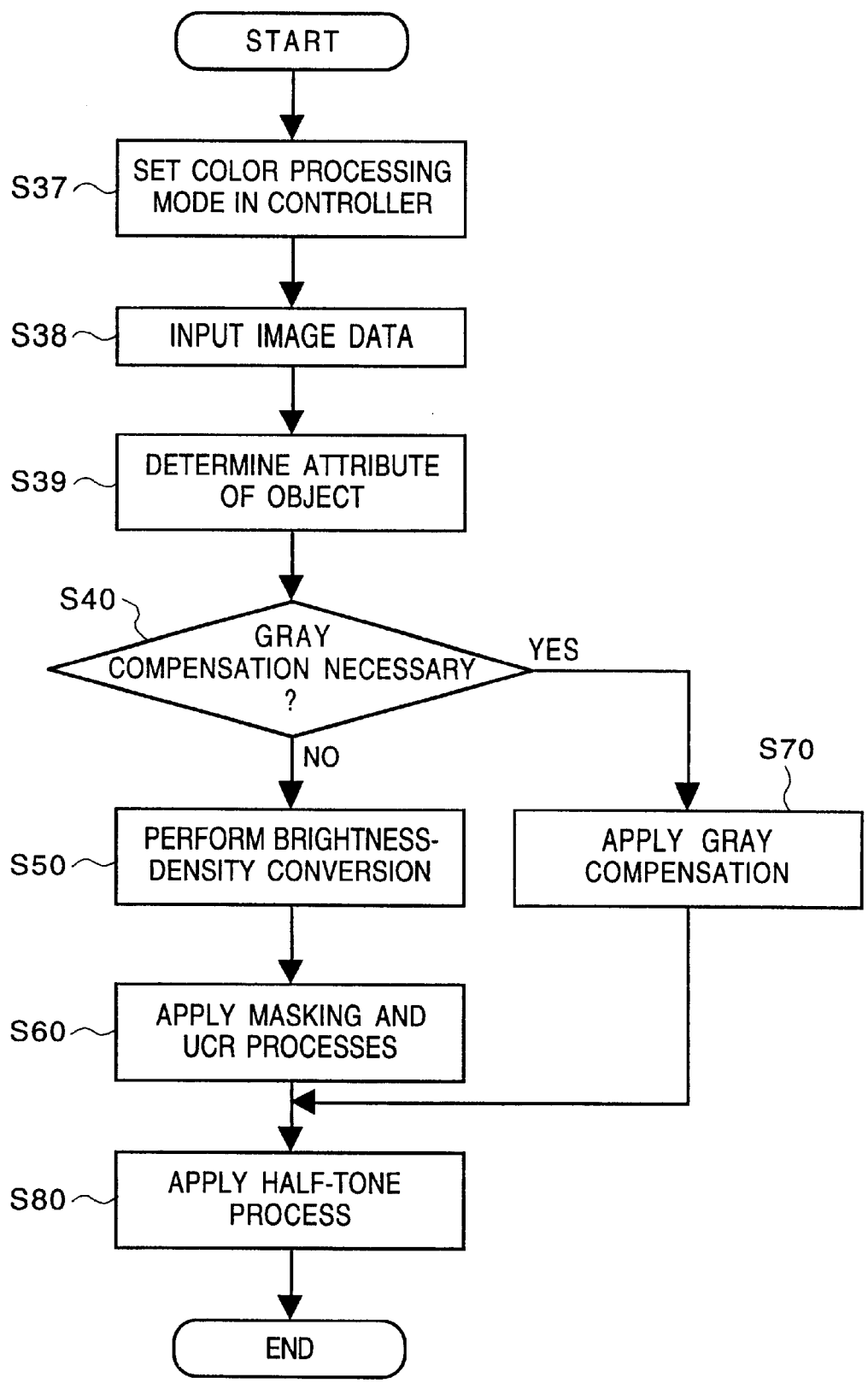
FIG. 3 is a flowchart showing an example of processing performed by a printer color processing unit and a gray compensation unit shown in FIG. 1.

Further, the printer 60 includes a controller 70 for transmitting/receiving various kinds of control data to/from the host device 10 and performing image processing, which will be explained later, on print data from the host device 10; an engine 80 for forming a permanent visual image on a print paper sheet on the basis of the print data from the controller 70 in accordance with control signals from the controller 70; and a CPU 90 for controlling the overall operation of the printer 60 in accordance with a control sequence, shown in FIG. 3, for example, which is stored in an internal memory (MEM).

The controller 70 comprises a printer color processing unit 71, a gray compensation unit 72, a half-tone processing unit 73, and a gray determination unit 74.

The host device 10 inputs an image data obtained by reading an original, such as a photograph, by the scanner 52 to the driver 20. Further, it also generates image data, including image data corresponding to an image generated while confirming the image displayed on the monitor 51 by executing an application program, which is expressed in a page description language (PDL) for printing out the image, and outputs the image data to the driver 20.

Figure 5:
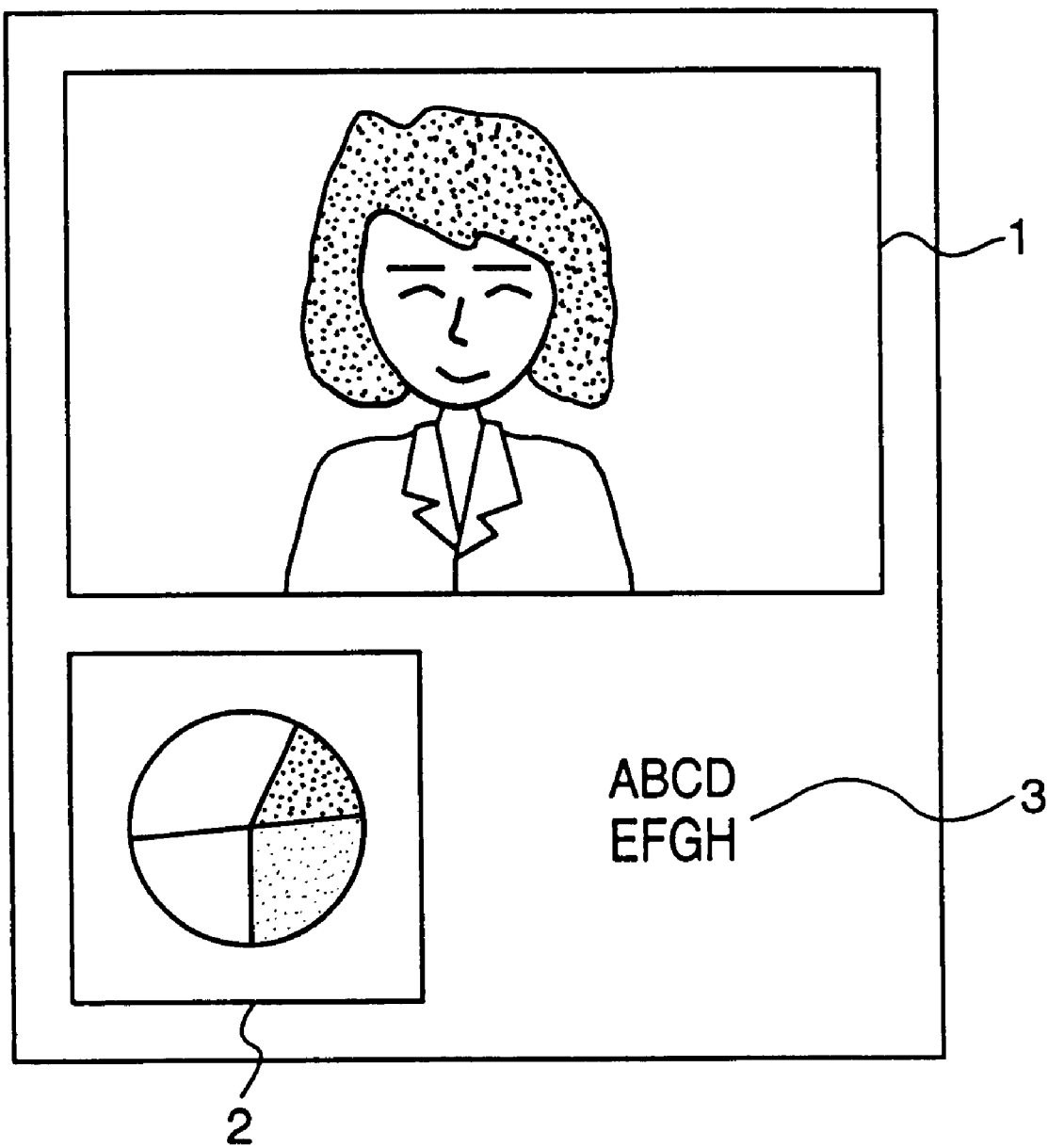
FIG. 5 depicts an example of an image.

Here, the output image includes a plurality of objects having different attributes as shown in FIG. 5, for example. In FIG. 5, reference numeral 1 denotes a natural image, such as a photograph, 2; a graphic image; and 3, a text image.

The driver 20 performs color processing, under control of the CPU 40, corresponding to a color processing mode set for color data of the image data by the operation unit 53.

Next, a flow of the processing performed by the color matching unit 21 of the driver 20 is explained with reference to the flowchart shown in FIG. 2.

First at step S10, image data expressed in PDL is inputted. The image data expressed in PDL includes a drawing command and color data. Next at step S11, the attribute of an object including the image data inputted at step S10 is determined on the basis of the drawing command included in the input image data. In this determination process, it is determined whether the input image data is data of a natural image, such as a photograph, or graphic data, or text data.

At step S12, the source profile corresponding to the source device set by the operation unit 53 and the printer profile corresponding to the printer 60 are read from the profile storage 30, and both profiles are set. Then at step S13, the color matching mode (details are explained later), set by operation unit 53, is set.

At step S14, the color matching processing, corresponding to the source device of the color data, is performed on the color data on the basis of the source profile which has been read from the profile storage 30 and set. Next at step S15, color matching processing corresponding to the printer is performed on the basis of the attribute of the object including the image data determined at step S11, the printer profile set at step S12, and the color matching mode set at step S13, by using a three dimensional look-up table (LUT) stored in the printer profile.

By performing the color matching processing, it is possible to adjust the difference between color expression characteristics, such as color representation capabilities, of a source device (e.g., scanner 52 and monitor 51) and the printer 60, thereby increasing the quality of the output image.

The color matching processing corresponding to the source device in this embodiment is to convert color data which depends upon the source device into color data which is independent of a device on the basis of the source profile. More specifically, color data is converted into L*a*b* data, for example, by using matrix coefficients stored in the source profile.

Further, the color matching processing corresponding to the printer in this embodiment is to perform color space compression in the L*a*b* color space, for example, in accordance with color representation capability of the printer and to convert L*a*b* data to RGB data by using the three-dimensional LUT.

In this embodiment, the following three methods are available as color matching methods (CMM).

(1) Color-Priority CMM

Color-priority CMM is suitable for a natural image, such as a photograph. In the color-priority CMM, hue and color tonality of an image are given top priority, and the overall image is mapped into the color gamut of the printer 60 so that the number of color-levels which exist beyond the color gamut of the printer 60 are preserved.

(2) Saturation-Priority CMM

Saturation-priority CMM is suitable for a graphic image generated by using an application software on the host device 10. The graphic image is generated by using an application while the user confirming the graphic image displayed on a monitor. Therefore, the reproduction of bright colors in the displayed image, i.e., the chromaticness of the image, is given top priority. Therefore, color component data existing beyond the color gamut of a printer is mapped into the color gamut of the printer so as to preserve the chromatic components of the color component data.

(3) Colorimetric Matching CCM

Colorimetric matching CCM is suitable for a text image, such as character and logotype, generated while being designated to a specific color by a user in an application. In colorimetric matching CCM, color component data is mapped to the color gamut of a printer such that the color difference ($\Delta E$) between the input image and the output image becomes the minimum so as to faithfully reproduce the specific color.

Meanwhile, the $\gamma$ correction processing unit 22 applies $\gamma$ correction by using a one-dimensional LUT to each color component included in color component data on the basis of a $\gamma$ correction value set by the operation unit 53 regardless of the attribute of the object which includes the color component data.

The changeover between the operation of the color matching unit 21 and the $\gamma$ correction processing unit 22, i.e., the changeover between the color matching processing and the $\gamma$ correction processing, is performed by the CPU 40 on the basis of a color processing mode manually set by the operation unit 53 depending upon a user's utilization of an image.

It is possible to adjust the difference in color representation capability between devices, such as difference between color gamuts of a source device and the printer 60, as well as increasing the quality of an output image by performing the color matching processing. However, it takes a considerably long time to perform color matching processing corresponding to a source device and a printer. In contrast, the $\gamma$ correction in this embodiment performs the same $\gamma$ correction on all the objects in an image by using the one-dimensional LUT. Therefore, high-speed processing is possible, although the image quality is not as high as the one applied with the color matching processing.

In consideration of the aforesaid processing characteristics, a user sets which color processing is to be performed from the operation unit 53, thereby realizing color processing suitable to the user's utilization.

The CPU 40 controls the color processing performed by the driver 20 as well as notifying the CPU 90 of the printer 60 of a color processing mode set by the operation unit 53 by using a command 91.

In response to this notification, the CPU 90 of the printer 60 controls the controller 70 to perform color processing on the color data of the image, expressed in PDL, which is input from the host device 10 on the basis of the designated color processing mode notified by the command 91, and converts RGB data inputted from the driver 20 into CMYK data corresponding to the output characteristics of the printer 60.

Color processings performed by the controller 70 will be explained below with reference to a flowchart shown in FIG. 3.

First, the CPU 90 sets the color processing mode to be used in the controller 70 to the gray determination unit 74 on the basis of the command 91 from the host device 10 at step S37. More specifically, whether or not a gray compensation is to be performed on objects of different attributes (i.e., whether or not to turn on the gray compensation) is set.

Next at step S38, the CPU 90 instructs the controller 70 to input image data, expressed in PDL, transmitted from the host device 10. Then at step S39, the CPU 90 controls the gray determination unit 74 to determine the attribute of an object on the basis of the drawing command included in the image data, similarly to step S11 shown in FIG. 2.

At step S40, the gray determination unit 74 detects whether the gray compensation process for the attribute of the object is set ON (to perform the gray compensation) or not in the color processing mode set at step S37 as a determination result performed at step S39. If the object is the one for which the gray compensation process is set ON as the determination result, the gray determination unit 74 further determines whether color component (RGB) data included in the image data of the object represents gray or not. More specifically, whether or not color component values of the RGB data are the same, i.e., whether R=G=B, is judged. If R=G=B, i.e., if it is determined that the color is gray, the process moves to step S70 and the gray compensation is performed.

The gray compensation performed at step S70 is a process to convert color component data representing a gray color into data represented by the K component of YMCK density data by using a predetermined three dimensional LUT which is preset in the gray compensation unit 72. Accordingly, the color is represented by using only one printing material, such as black ink and black toner. Note, the other components (Y, M, and C components) of the density data in this case are C=M=Y=0.

By performing the aforesaid process, a possibility that printed positions of the Y, M, C and K printing materials for expressing a gray color by mixing these printing materials are slightly shifted because of an influence of masking and under color removal (UCR) processes is removed. Especially, in the low density gray portion, a problem in which any of Y, M and C colors stands out more than a gray color can be prevented.

The process proceeds to step S80 thereafter.

Whereas, if it is determined that the gray compensation is not set ON at step S40, or in a case where the color component data included in the image data is not determined as gray when the gray compensation is set ON, in other words, in a case where the image data belongs to an object for which the gray compensation is not set or represents colors other than gray, the process goes to step S50 where brightness-density conversion is performed.

In the brightness-density conversion at step S50, the RGB data is converted into YMC data. Then at step S60, masking and UCR processes corresponding to the output characteristics of a printer is applied to the YMC data, then YMCK data is generated. Thereafter, the process proceeds to step S80.

Half-tone processing by the half-tone processing unit 73 is performed at step S80. More specifically, the half-tone processing unit 73 converts data expressed in PDL to raster data which expresses each pixel in n levels (n: integer, n>1) on the basis of the drawing command corresponding to the YMCK data generated at step S60 or S70, as well as performing half-tone processing such as a $\gamma$ correction and a dither process.

The color processing modes which can be set by a user from the operation unit 53 in this embodiment are combinations of the following two selections; the selection between color matching processing performed by the driver 20 and the γ correction, and the selection between ON and OFF of gray compensation performed by the controller 70.

ON or OFF of the gray compensation is determined in the following manner in this embodiment.

For example, there is a limit in view of an expressible gray tone range in a case where a single printing material, such as black ink and black toner, is utilized compared to a case where a gray color is expressed by using four printing materials, namely, Y, M, C and K printing materials.

Therefore, while putting weight on the reproduction of a gray color, gray compensation is set in advance to always be performed (i.e., gray compensation ON) on a text image object whose tonality is not so important. Whereas, in processing a natural image, such as a photograph, which is an object where both the hue and tonality are important, gray compensation is set in advance not to be performed (i.e., gray compensation OFF).

As for a graphic image, there are cases where tonality of a gradation image, for example, is considered as an important factor and where reproduction of a gray color is considered as the important factor. Therefore, it is not appropriate to set the ON/OFF of the gray compensation in advance. Accordingly, the setting of the gray compensation for the graphic image is left to a manual instruction by a user.

According to the embodiment as described above, by setting the various selections of the color processing modes in advance as much as possible, in consideration of color characteristics of a reproduced image, it is possible to reduce a number of manual instructions for complicated color processing mode settings, thereby reducing a load for a setting operation by the user.

Next, a sequence for setting a color processing mode from the operation unit 53 according to the embodiment is explained with reference to FIG. 4.

Figure 4:
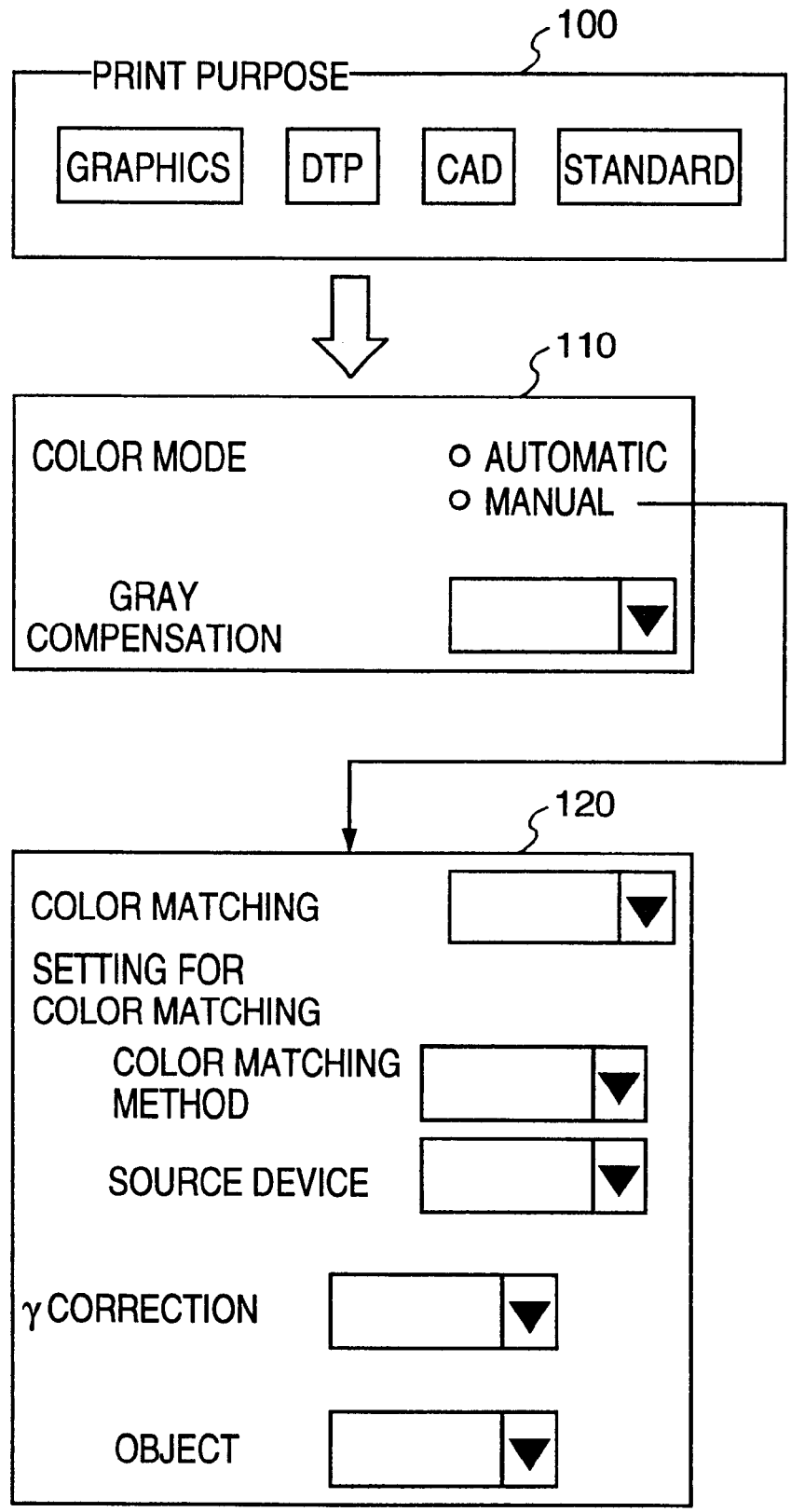
FIG. 4 depicts an example of displayed images used for setting a color processing mode in an operation unit shown in FIG. 1.

FIG. 4 is an explanatory view showing an operation guidance displayed on a display screen of the monitor 51 for setting a color processing mode.

Since, it is necessary to set a color matching processing as well as gray compensation for each object in this embodiment, several recommendable patterns of color processing modes corresponding to print purposes are stored in a memory (MEM) in the host device 10 in order to make the complicated setting operation as easy as possible.

Accordingly, the user can select a desirable color processing mode from the set patterns of the color processing modes, corresponding to several print purposes, stored in the memory through or via the user interface (UI) shown on the display screen 100 in FIG. 4. The following four color processing modes, from which the user can select a desired color processing mode, are displayed on the display screen 100.

(1) Graphics

This color processing mode is suitable for an image which only includes objects of graphic images. In this mode, color matching processing based on the saturation-priority CMM is applied to all the objects as well as the gray compensation being set ON. When this color processing mode is set, since the process for determining the attribute of an object is not performed in the color matching processing, it is possible to process an image faster than processing the image in standard color processing mode (which will be explained later).

(2) DTP (Desk Top Publishing)

This color processing mode is suitable for an image, to be formed on a single print paper sheet, including an object of a natural image, such as a photograph, for example, and an object or objects of attributes other than that of a natural image. For instance, it is suitable for an image, to be printed on a single print paper sheet, including the natural image 1, the graphic image 2, and the text image 3 as shown in FIG. 5.

In the example shown in FIG. 5, since an original of the natural image 1 is a photograph, its source device is the scanner 52. Further, since images of originals of the graphic image 2 and the text image 3 are displayed images on the monitor 51, their source device is the monitor 51. As described above, the source devices of the objects differ.

However, depending upon the user's utilization of the image, the image displayed on the monitor 51 which is obtained when arranging the layout of the objects on the monitor 51 may be treated as an original image. In this case, the source device of the natural image 1, the graphic image 2, and the text image 3 becomes the monitor 51.

However, in many cases, when a natural image and an other object or objects of attributes other than that of a natural image are included in an image to be formed on a single print paper sheet, for example, source devices can not be fixed to one. Therefore, in this color processing mode, it is set to perform a different color matching processing for each object by using the preset default CMM, and the gray compensation is set ON so as to be executed, as well as the input guidance 120, shown in FIG. 4, is displayed on the monitor 51 to prompt a user to specify a source device for each object.

(3) CAD (Computer Aided Design)

In this color processing mode, since an image formed by using CAD is expressed by black thin lines, the gray compensation is set ON so as to be executed. However, the color matching processing maps color component data to the color gamut of the printer, as described above, there is a possibility that the black thin lines are erased in the mapping process. Therefore, in this color processing mode, the color matching processing is set so as not to be performed by the driver 20. Instead, a recommended γ correction value is set so as to set γ correction being performed so that the black thin lines are reproduced.

(4) Standard

In this color processing mode, the monitor 51 is assumed as a source device, color matching processing for each object is set to be performed by using the preset default CMM, and the gray compensation is set ON.

Note, in the color matching processing for each object using the default CMM, attributes of objects and the CCM are set as below.

TABLE 1

| Attribute of Object | CMM |
|---|---|
| Natural Image | Color-Priority CCM |
| Graphic Image | Saturation-Priority CCM |
| Text Image | Colorimetric Matching CCM |

When a user selects the print purpose from the menu on the displayed image 100 shown in FIG. 4 using the operation unit 53, the subsequent menus, such as the input guidance 110 and the input guidance 120, which correspond to the selected print purpose are displayed on the display screen of the monitor 51.

When the user selects "MANUAL" in the input guidance 110, ON/OFF of the gray compensation and various options, shown in the input guidance 120, can be arbitrarily set.

In the input guidance 120, it is possible to set the CMM and the source device for each object by selecting the object and a color matching processing. Further, by selecting "all objects" in the "OBJECT" box, the same CMM is to be performed on all the objects regardless of their attributes. In this setting, it is possible to process the image faster than to perform a particular color matching processing for each object.

Note, the γ correction which is performed when the color matching processing is not performed is applied to all the objects by using an identical parameter. This setting is to perform the γ correction at high speed.

According to this embodiment as described above, since color processing modes corresponding to a plurality of typical print purposes (i.e., types of images to be outputted) are prepared in advance, a complicated setting operation of each option for a color processing mode can be omitted if one of the set color processing modes is suitable for the user's utilization of an image, thereby reducing the work load of the user.

Further, detailed options on the set color processing mode from the print purpose selection can be delicately adjusted by selecting "MANUAL" in a color mode of the input guidance 110.

It should be noted that the input color is determined to be gray if all of the R, G and B component data have an identical value (i.e., R=G=B), however, some allowance for the determination may be set so that the color whose R, G and B color component data have the relationship, R≈G≈B, is determined as gray.

OTHER EMBODIMENT

The present invention can be applied to a system constituted by a plurality of devices (e.g., host computer, interface, reader, printer) or to an apparatus comprising a single device (e.g., copying machine, facsimile machine).

Further, it goes without saying that the invention is applicable also to a case where the object of the invention is attained by supplying a program to a system or apparatus.

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the image processing system shown in FIG. 1 can be replaced by a system configuration as shown in FIG. 6. In this configuration, color matching processing or γ correction processing performed by the driver 20 are realized by executing programs (e.g., a color matching processing program and a γ correction processing program) supplied from a floppy disk, a CD-ROM, or the like, by a high performance CPU 40' provided in the host device 10. Meanwhile, the high performance CPU 90' provided in the printer 60 installs programs (e.g., a gray determination processing program, gray compensation processing program, printer color processing program, half-tone processing program), which are provided from a floppy disk, a CD-ROM, and the like, and down loaded from the host device 10, in its internal memory, and performs the gray determination processing, gray compensation processing, printer color processing, half-tone processing, and so on, on input data. Note that, in FIG. 6, numeral 54 denotes a floppy disk drive and numeral 55 denotes a CD-ROM drive.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and a ROM can be used for providing the program codes.

Furthermore, besides the aforesaid functions according to the above embodiment being realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiment.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for processing a plurality of objects constituting an image, said apparatus comprising:
    a setting unit, operated by a user to manually input an instruction to set a source device in correspondence with an attribute of an object, the attribute including photo and graphic;
    a determination unit, arranged to determine the attribute of the object, the object comprising a portion of an inputted image; and
    a color matching unit, arranged to perform color matching processing by using a profile corresponding to the source device set by said setting unit, based on the attribute of the object determined by said determination unit.

2. The apparatus according to claim 1, wherein said setting unit respectively sets source devices for attributes of a plurality of objects based on the manually inputted instruction.

3. The apparatus according to claim 1, wherein said color matching unit performs a first color matching process corresponding to the source device and a second color matching processing corresponding to an output device, which is to output an image, as the color matching processing.

4. The apparatus according to claim 3, wherein the second color matching processing includes color matching processing performed based on a color matching method corresponding to the attribute of the object determined by said determination unit.

5. The apparatus according to claim 1, further comprising a color processor, arranged to perform color processing based on output characteristics of an output device for outputting an image corresponding to the attribute of the object.

6. The apparatus according to claim 1, further comprising an image former, arranged to form a color image using data processed by said color matching unit.

7. The apparatus according to claim 1, wherein the attribute further includes text.

8. The apparatus according to claim 1, wherein the source device is one of a scanner and a monitor.

9. An image processing method of processing a plurality of objects constituting an image, said method comprising the steps of:

a user manually inputting an instruction to set a source device in correspondence with an attribute of an object, the attribute including photo and graphic;

determining the attribute of the object, the object comprising a portion of an inputted image; and performing color matching processing by using a profile corresponding to the set source device, based on the determined attribute of the object.

10. The method according to claim 9, wherein said inputting step respectively sets source devices for attributes of a plurality of objects in accordance with the manually inputted instruction.

11. The methed according to claim 9, wherein a first color matching processing corresponding to the source device and second color matching processing corresponding to an output device, which is to output an image, is performed as the color matching processing.

12. The method according to claim 11, wherein the second color matching processing includes a color matching processing performed based on a color matching method corresponding to the determined attribute of the object.

13. The method according to claim 9, further comprising the step of performing color processing based on output characteristics of an output device for outputting an image corresponding to the attribute of the object 14. The method according to claim 9, wherein the source device is one of a scanner and a monitor.

15. A computer program product comprising a computer-readable medium that includes computer program codes for executing image processing to process a plurality of objects constituting an image, said program product including:

setting process procedure codes for setting a source device in correspondence with an attribute of an object, based on an instruction manually inputted by a user, the attribute including photo and graphic;

determination process procedure codes for determining the attribute of the object, the object comprising a portion of an inputted image; and color matching process procedure codes for executing color matching processing using a profile of the set source device in correspondence with the determined attribute of the object.

16. The computer program product according to claim 15, wherein the source device is one of a scanner and a monitor.

* * * * *

UNITED STATES PATENT AND TRADEMARK OFFICE
CERTIFICATE OF CORRECTION

PATENT NO.    : 6,266,152 B1
DATED         : July 24, 2001
INVENTOR(S)   : Nobuyuki Nakajima It is certified that error appears in the above-identified patent and that said Letters Patent is hereby corrected as shown below:

Column 1,
Line 58, "be further comprises" should read -- further comprise --.

Column 3,
Line 28, "are" should read -- is --.

Column 4,
Line 6, "photograph, 2;" should read -- photograph 2; --.

Column 5,
Line 5, "user" should read -- user is --.

Column 6,
Line 54, "is" should read -- are --.

Column 8,
Line 40, "set" should read -- ensure --.

Column 10,
Line 20, "CPU" should read -- a CPU --.

Signed and Sealed this

Ninth Day of April, 2002

Attest:

Attesting Officer

JAMES E. ROGAN
*Director of the United States Patent and Trademark Office*